United States Patent
Oosterhout et al.

(10) Patent No.: US 6,884,137 B2
(45) Date of Patent: *Apr. 26, 2005

(54) METHOD FOR MANUFACTURING GLASS PANEL FOR A CATHODE RAY TUBE

(75) Inventors: Gehardus Meintes Oosterhout, Eindhoven (NL); Hermanus Nicolaas Tuin, Best (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/158,429

(22) Filed: May 30, 2002

(65) Prior Publication Data

US 2002/0180336 A1 Dec. 5, 2002

(30) Foreign Application Priority Data

Jun. 1, 2001 (EP) ............................................. 01202109

(51) Int. Cl.[7] .......................... H01J 29/86; C03B 11/12
(52) U.S. Cl. ............................................. 445/22; 65/69
(58) Field of Search ....................... 445/30, 22, 45–47, 445/36; 313/447 R, 447.2, 461, 480; 65/68–69, 84–85, 103, 355, 138; 428/13–14, 34

(56) References Cited

U.S. PATENT DOCUMENTS

| | | | | |
|---|---|---|---|---|
| 4,564,785 A | * | 1/1986 | Sato et al. | 313/422 |
| 4,752,268 A | * | 6/1988 | Kataoka et al. | 445/66 |
| 4,871,385 A | * | 10/1989 | Lecourt et al. | 65/115 |
| 4,904,899 A | * | 2/1990 | Nakata et al. | 313/477 R |
| 5,445,285 A | * | 8/1995 | Sugawara et al. | 220/2.1 A |
| 5,837,026 A | * | 11/1998 | Sugawara et al. | 65/66 |
| 5,904,962 A | * | 5/1999 | Harding et al. | 428/14 |
| 5,925,977 A | * | 7/1999 | Sugawara et al. | 313/477 R |
| 5,964,364 A | * | 10/1999 | Shimizu et al. | 220/2.1 A |
| 5,964,916 A | * | 10/1999 | Segawa et al. | 65/374.11 |
| 6,015,288 A | * | 1/2000 | Mundon | 432/212 |
| RE36,838 E | * | 8/2000 | Sugawara et al. | 313/477 R |
| 6,200,132 B1 | * | 3/2001 | Mundon | 432/212 |
| 6,807,825 B1 | * | 10/2004 | Kuin et al. | 65/69 |

OTHER PUBLICATIONS

U.S. Appl. No. 10/124012, filing date Apr. 2002, Georgius et al..*

* cited by examiner

Primary Examiner—Joseph Williams
Assistant Examiner—Dalei Dong

(57) ABSTRACT

A method for producing CRT screens includes the step of reducing the cooling rate of part of a press-formed glass screen during the cooling stage. The outside portion of the screen, i.e., the side normally facing a viewer, normally has a higher cooling rate than the inside portion of the screen, which leads to unwanted stresses in the finished product. The cooling rate of the outside portion of the screen is reduced by reflecting the heat radiating from the outside portion during the cooling process, and/or providing extra heat to the outside portion from a heater. The reduction in the cooling rate is preferably done during the transport of the glass screen from the press to the cooling oven. The method provides for systematic cooling of the inside and outside portions of the glass screen at nearly the same cooling rate.

7 Claims, 3 Drawing Sheets

METHOD FOR MANUFACTURING GLASS PANEL FOR A CATHODE RAY TUBE

TECHNICAL FIELD

The invention relates to a method for manufacturing a glass panel, having an inner and an outer face portion, for a display tube, comprising a first stage of press-forming molten glass put in a mold and a second stage of cooling the formed glass after it has been taken out from the mold. The invention relates in particular to (a method of manufacturing) a High Surface Compression Panel.

BACKGROUND AND SUMMARY

In the known methods a glass panel is press-formed which usually takes place at very high temperatures (1000° C.–1100° C.). In this manner a glass face panel can be formed. Cathode ray tubes, for example, comprise such a glass panel.

Cathode ray tubes (CRT's) are becoming of ever more greater size, thus increasing the weight of the CRT's. Furthermore the front surface of the glass panel is becoming ever more flatter. However, increasing the flatness of the front surface of the face panel generally increases also the weight of the glass panel because the thickness of the glass panel has to be increased to ensure safety against implosion or explosion of the CRT.

There exists a great need for increase in strength of the CRT, and in particular of the glass panel, without increasing the weight. An increase in the strength of the glass panel may improve the yield.

The present invention is aimed at providing a method which enables increasing the yield of the method and/or reducing the weight of the glass panel.

To this end the method in accordance with the invention is characterized in that during at least a part of the second stage the heat radiation of the outer face portion of the panel is reduced to reduce a difference in cooling rate between the inner and outer face portion.

The invention is based on the insight that during the cooling stage inhomogeneities in the stress level in the panel can occur. In order to improve the strength of (Real Flat) display panels the cooling velocity after press forming is usually increased to a such extent that a compressive stress is produced in the surface in the order of 3 to 25 Mpa. Panels of this type are called High Surface Compression panels. Trying to correct for the above inhomogeneities in the stress level during a final annealing step would easily affect the necessary compressive stress (surface stress). This reduces the yield and can seriously affect the safety of the tubes. This is in particular important for panels with an (almost) flat inner and/or outer surface such as Real Flat panels.

The intention of the inventive cooling process is to render the cooling rates of the inner and outer face portion more symmetrical. By this is meant that during cooling the inner and outer face portion pass at substantially the same moment the temperature $T_g$ (which is the temperature at which the glass changes from the viscous to the solid state). A reduction in cooling can be advantageously realized by placing a heat reflection means opposite to the outer face portion of the panel.

Reducing the heat radiation of the outer face portion of the panel has been found to be an effective means to reduce temperature gradients over the panel thickness. Radiation transport is responsible for 40–70% of the heat transport. Cooling with air of other portions alone is less efficient. This effect may for instance be used in practice to manufacture panels with a lower weight, or panels with a flatter front surface, or to reduce the fall-out, i.e., the percentage of panels that does not pass safety tests, or any combination of these beneficial effects.

According to a first embodiment a heat reflection means is arranged at a position facing the outer face portion of the panel, advantageously a heat reflection means is used in combination with a heating means for a stronger effect.

According to a further embodiment a heat reflection means is used which comprises at least one plate made of a material selected from the group comprising Ni, Al, Au, Al-oxide, or covered with a such material.

To increase the effect of the heat reflection means a heat absorption means may be arranged facing the inner face portion of the glass panel.

In view of the above it is in particular an aspect of the invention to provide a display panel of the High Surface Compression type which presents substantially no tensile stresses in the (view window) area between the inner and outer face portion of the panel.

These and other aspects of the invention will be apparent from and elucidated with reference to the embodiments described hereinafter.

BRIEF DESCRIPTION OF THE DRAWING FIGURES

DETAILED DESCRIPTION

Figure 1:
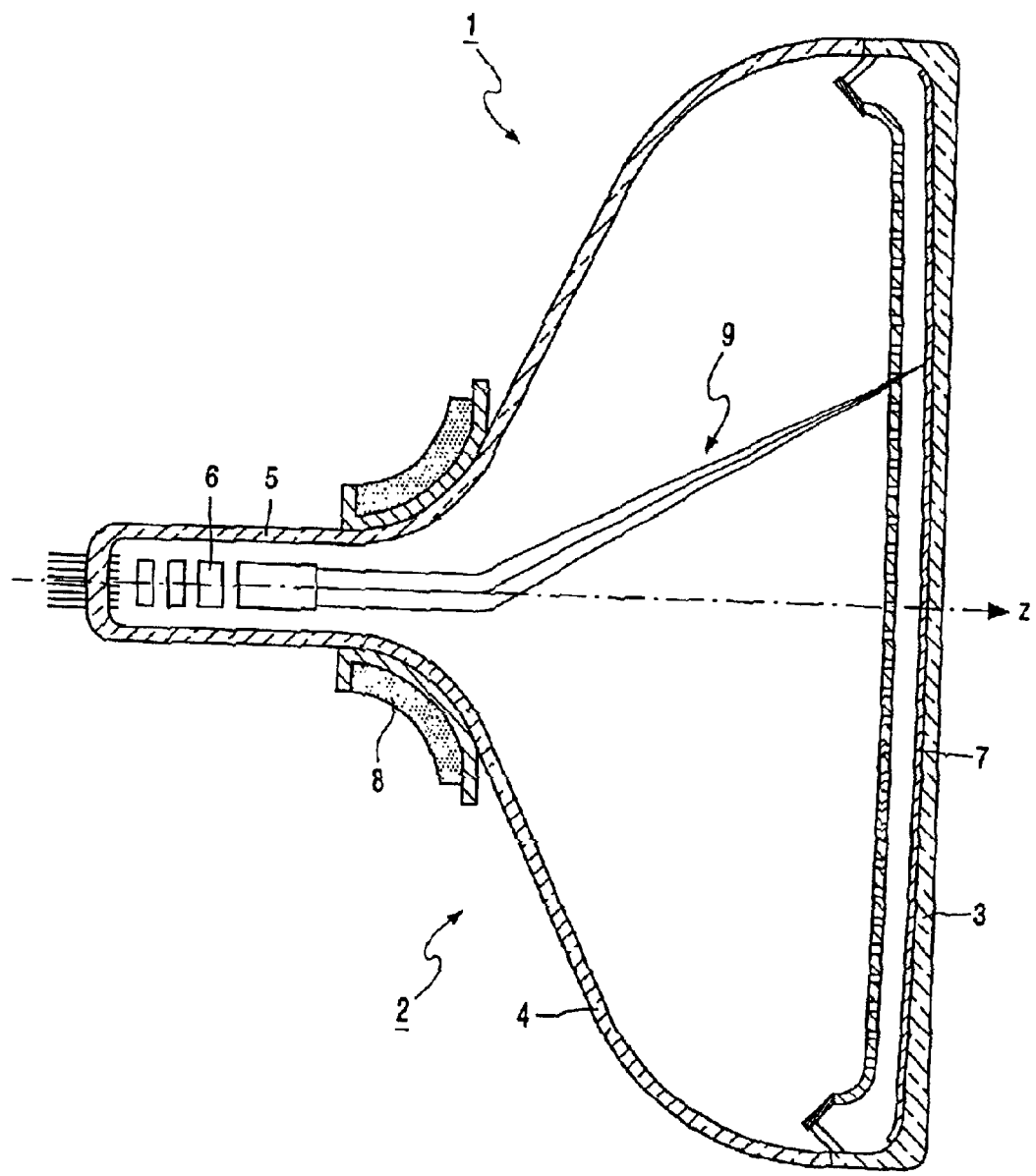
FIG. 1 is a schematic view of a cross-section of a display tube, having a press-formed glass panel.

The Figures are purely schematic and not drawn to scale. In particular for clarity, some dimensions are exaggerated strongly. In the Figures, like reference numerals refer to like parts, whenever possible.

FIG. 1 is a schematic view of a cross-section of a display tube 1 having a glass envelope 2 which includes a display panel 3, a cone 4 and a neck 5. In the neck 5, there is an electron gun for generating one or more electron beams 9. The electron beam is focused on a phosphor layer 7 on the inner surface of the display panel 3 and deflected across the display panel 3 in two mutually perpendicular directions by means of a deflection coil system 8.

Display devices often comprise cathode ray tubes or television display tubes 1 which are entirely made of glass and are built up of two or more portions with glass walls of different thicknesses or different heat-absorption characteristics. For example, a glass television display tube 1 customarily comprises a glass display panel 3 and a glass cone 4 which are separately produced and subsequently united by fusing or using a (solder) glass fit, the joint formed being hermetically tight. The display panel 3 of such tubes is formed by a glass wall whose thickness is much greater than the wall thickness of the cone parts of such tubes. Such a greater wall thickness of the display panel 3 serves to ensure that it is sufficiently rigid when the eventual tubes comprising such a panel are evacuated.

Figure 2A:
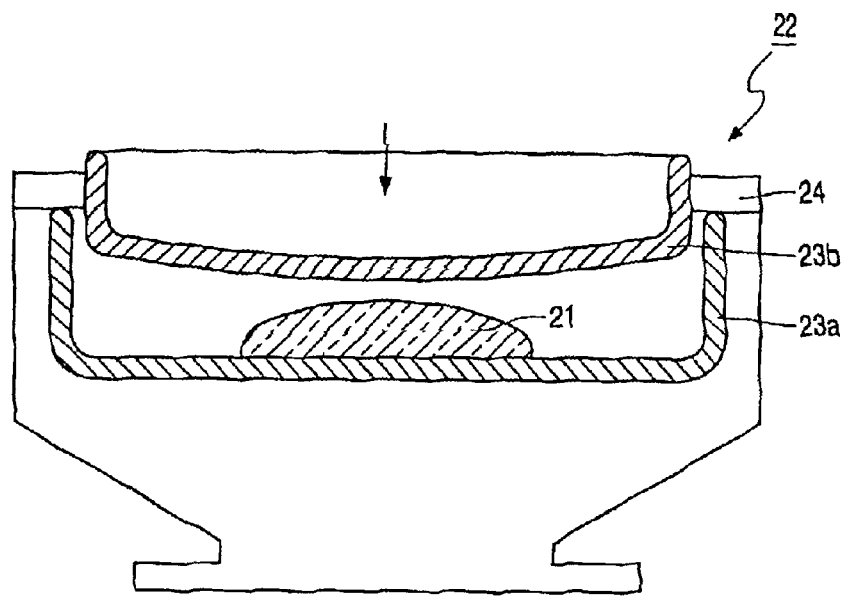
FIG. 2 illustrates the method of press-forming.
Figure 2B:
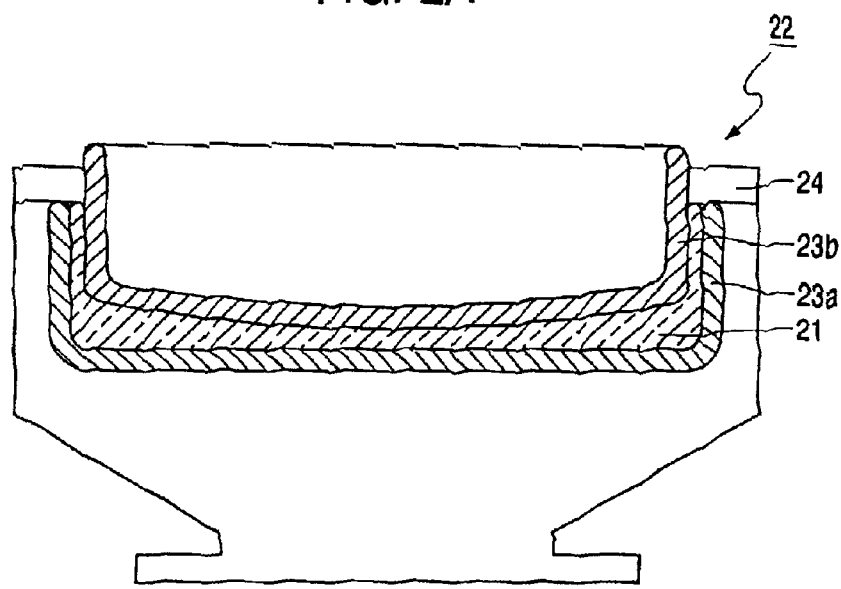
Figure 2C:
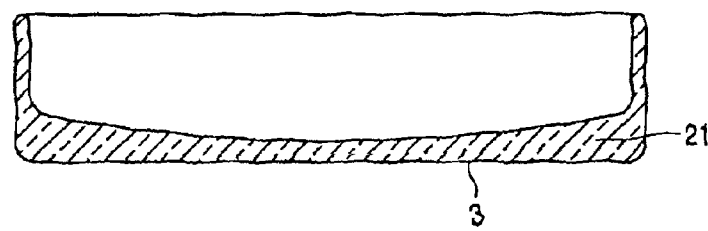

FIGS. 2A and 2B illustrate the method of press-forming. In a first method step (FIG. 2A) a glass volume 21 at a high temperature (typically 1100° C.–1000° C.) is supplied to a press 22 having a lower mould member 23a whose form corresponds to the form of the glass panel to be made, and a ring member 24. A glass panel is press-formed in the usual manner by pressing a plunger 23b in the mould member 23a, with the glass volume 21 in between (FIG. 2A). The warm glass which is in contact with the relatively cold press will cause the temperature and in particular the surface temperature of the glass to drop. After formation of the panel the plunger 23b is pulled back, the ring member 24 is removed, and the glass panel 3 is taken from the press and allowed to cool down. (FIG. 2C)

The invention is based on the insight of the inventors that the outer face portion will normally cool down faster than the inner face portion of the panel. Cooling rate differences over the thickness of the panel during cooling down will lead to unwanted stresses. To eliminate these stresses it is best to have a symmetric cooling condition.

To get a symmetric cooling condition during cooling down, it is necessary to adapt the local cooling. Cooling with heat flux Q is given by $$Q = Q_{rad} + Q_{conv} = 4\epsilon\sigma Tm^3(T_{glass} - T_{sur}) + h_{conv}(T_{glass} - T_{sur})$$

the convective part = $Q_{conv} = h_{conv}(T_{glass} - T_{sur}) = V^x(T_{glass} - T_{sur})$ the radiation part = $Q_{rad} = h_{rad}(T_{glass} - T_{sur}) = 4\epsilon\sigma Tm^3(T_{glass} - T_{sur})$ v = velocity of cooling air
$\epsilon$ = emission coefficient of surroundings
$T_{sur}$ = temperature of surroundings So local cooling can be adapted by:
(1) local variation in emission coefficient $\epsilon$,
(2) local variation in velocity of cooling air v, and
(3) local variation in temperature of surroundings $T_{sur}$ (local heating of surroundings). At 500–600° C., $h_{rad}$ ($\epsilon$=1) = 4*1*56.7E-9*(550+273)³=100 [W/m²K], so the radiative heat transfer is comparable to a strong convective heat transfer.

The radiative heat transfer can easily be changed by changing the emission coefficient, where changing the convective heat transport requires more effort. Therefore the inventions alters the local cooling of a panel by using a radiation controlling means which comprises:

opposite the outer face portion, a means for heat reflection, $\epsilon_r$ = low, optionally in combination with opposite the inner face portions, a means for heat absorption, $\epsilon_a$ = high.

The outer face portion of the panel 3 "sees" the reflection means, the inner face portion "sees" the absorption means. See FIGS. 3 and 4.

A suitable reflection plate should be able to reflect radiation in the infrared region. E.g. nickel plates, aluminum plates and (polished) Al-oxide plates have been found to be suitable.

Figure 3:
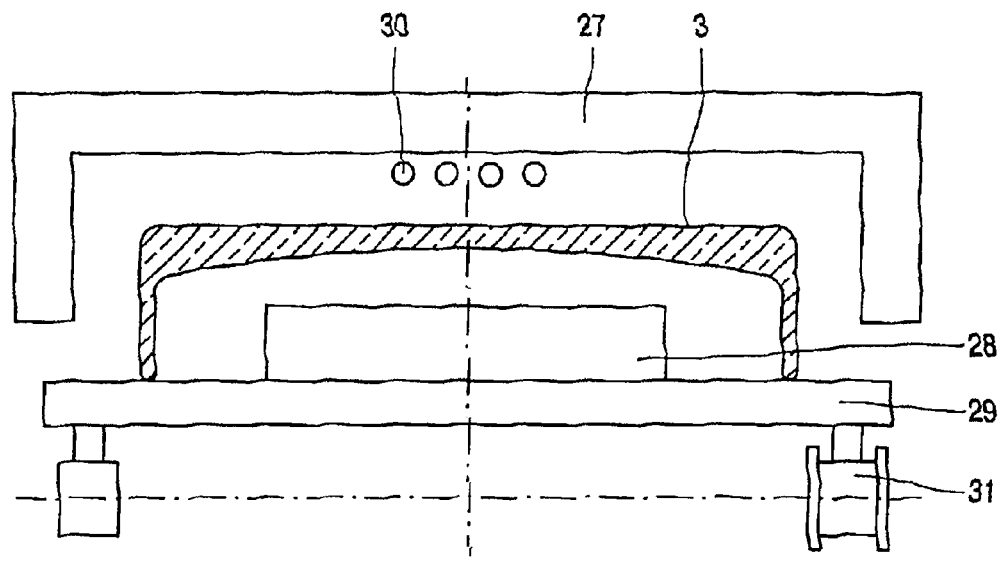
FIG. 3 illustrates a first arrangement of the glass panel during a cooling step in accordance with the invention.

In the set-up given in FIG. 3 the panel 3, after removal from the press, is placed "face up" on heat isolating support means 29 for transport by transport means 31 (transport belt) to a cooling lehr. The outer side of the panel 3 "sees" a heat reflection means (27), the inner side of the panel 3 "sees" an absorption means (28), e.g. a blackened steel plate. The means (27, 28) are placed opposite the outer surface and the inner surface of the panel 3, respectively. The reflection means 27 may be combined with a heater 30.

After the panel has been pressed, the panel is cooled very rapidly on the transport belt due to the surroundings at 50° C. By this rapid cooling very high stresses are induced. After this cooling (on a transport belt) the panel is put in an annealing lehr for a longer period at (for instance) 490° C. At this temperature a large part of the high stresses are relaxed. The resultant stress is the (relatively small) difference between high stresses caused by cooling in the surroundings and a large relaxation. Also because the relaxation is not linear (but exponential) with temperature, the cooling process is difficult to control.

To better control the temperature of the "surroundings", the set-up can be placed in an annealing lehr.

Figure 4:
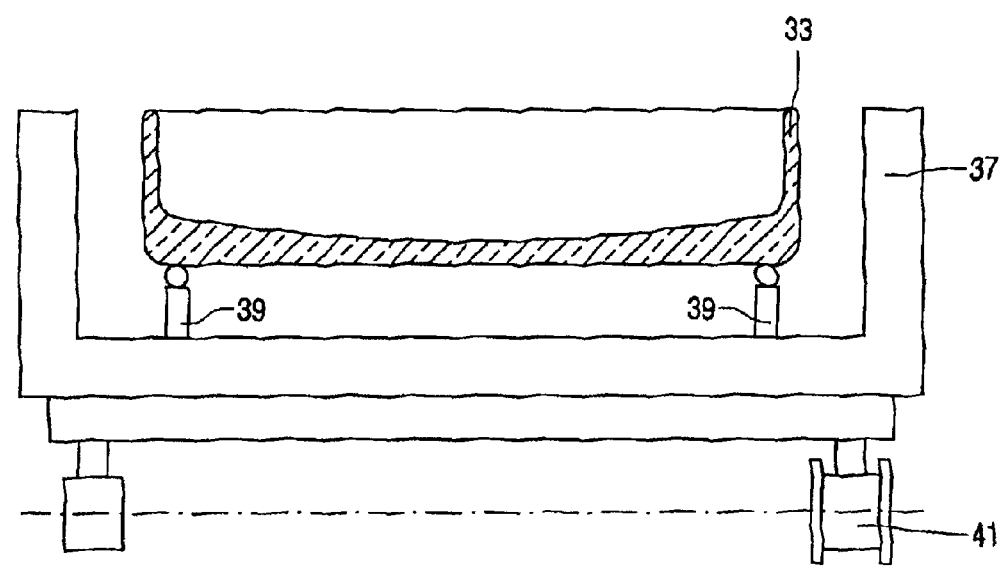
FIG. 4 illustrates a second arrangement of the glass panel during a cooling step in accordance with the invention.

In the set-up given in FIG. 4 a panel 33 is placed "face down" on heat isolating support means 39. The outer side of the panel 33 "sees" a heat reflection means (37). The means 37 is placed opposite the outer surface of the panel 33. The arrangement of glass panel 33 and heat reflection means 37 is transported by a transport means 41.

Summarizing, the invention relates to a method for producing CRT screens in which, during the cooling of the CRT screen, the cooling rate of the fast cooling parts of the screen is reduced. The outside of the CRT screen (the side facing the viewer of the CRT) normally has a higher cooling rate than the inside of the CRT screen by reflecting heat coming from the outside of the CRT screen back to the CRT screen and/or by providing extra heat to the outside of the CRT screen by a heater.

The method of the invention is preferably used during the transport of the CRT screen from the press to the lehr (cooling oven).

Advantages/Improvements

The invention provides means for a symmetric cooling of the CRT screen (inside/outside the same cooling rate) which will reduce unwanted stresses in the CRT screen and will increase the dimensional accuracy of the product.

What is claimed is:

1. A method for manufacturing a glass panel having an inner and an outer face portion, said panel comprising a viewing window and peripheral side walls, for a display tube, comprising a first stage of press-forming molten glass put in a mold and a second stage of cooling the formed glass after it has been taken out from the mold, wherein during at least a part of the second stage the heat radiation of the outer face portion of the panel is reduced to reduce a difference in cooling rate between the inner and outer face portion of the panel.

2. The method of claim 1, wherein means for reducing the heat radiation is arranged at a position facing the outer face portion of the panel.

3. The method of claim 2, the heat reflection means is combined with a heating means.

4. The method of claim 2, wherein a heat reflection means is used which comprises at least one plate made of a material selected from the group comprising Ni, Al, Au, Al-oxide, or covered with a such material.

5. The method of claim 2, wherein in addition a heat absorption means is arranged facing the inner face portion of the glass panel.

6. The method of claim 1, wherein the at least second stage includes the transport of the formed glass from the mold to a cooling lehr.

7. The method of claim 1, wherein the at least second stage exclusively includes the transport of the formed glass from the mold to a cooling lehr.

* * * * *